(No Model.)  5 Sheets—Sheet 1.

W. P. BARCLAY.
CAR WHEEL GRINDING AND TURNING MACHINE.

No. 303,609.  Patented Aug. 19, 1884.

WITNESSES:  INVENTOR
Howard L. Hawley  Wm. P. Barclay
Jno N. Cowper (No Model.) 5 Sheets—Sheet 2.

W. P. BARCLAY.
CAR WHEEL GRINDING AND TURNING MACHINE.

No. 303,609. Patented Aug. 19, 1884.

WITNESSES: INVENTOR (No Model.)
5 Sheets—Sheet 3.
W. P. BARCLAY.
CAR WHEEL GRINDING AND TURNING MACHINE.
No. 303,609.
Patented Aug. 19, 1884.
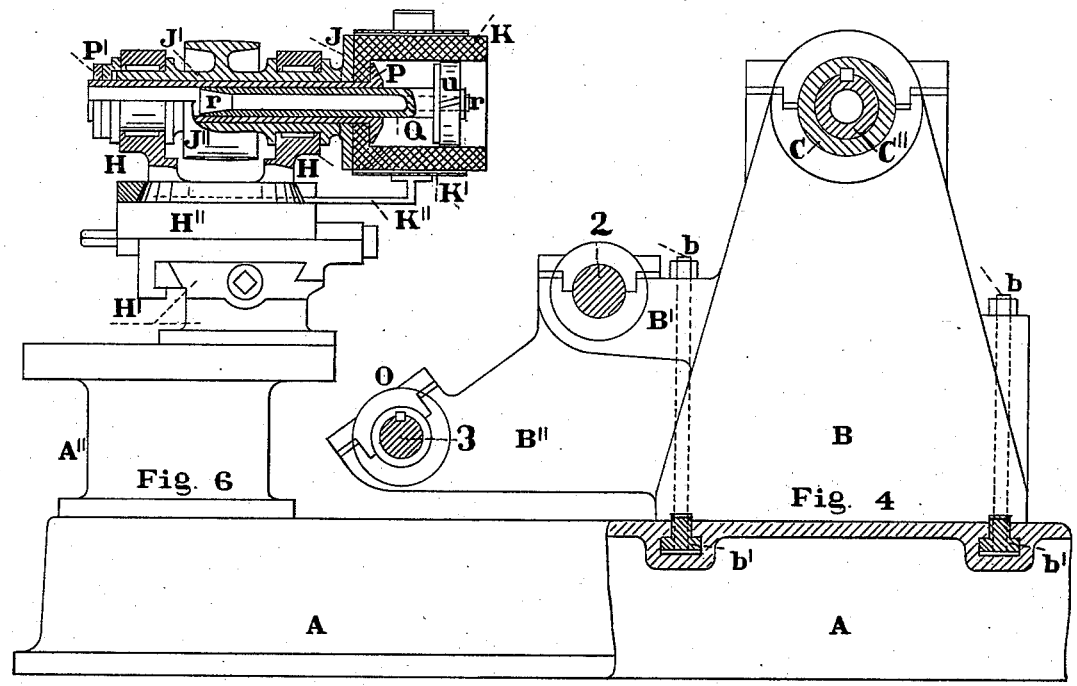
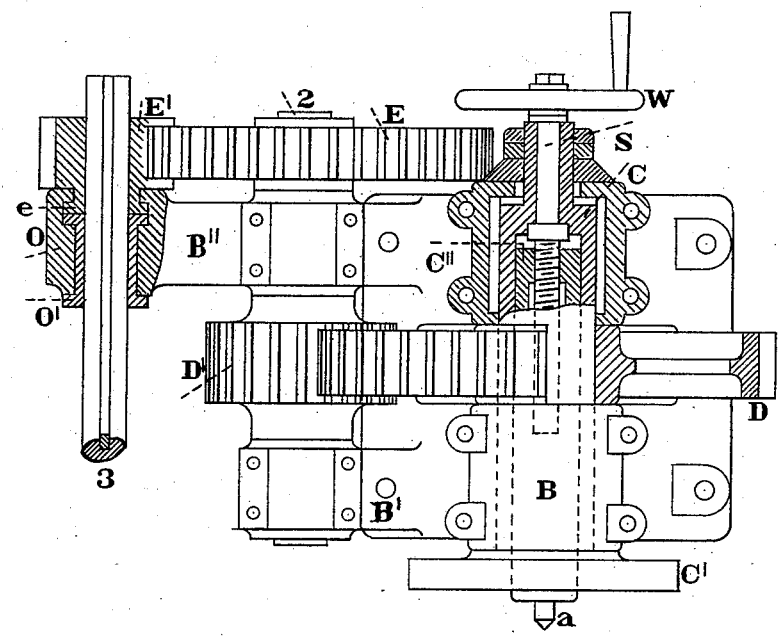
WITNESSES:
F. S. Johnson.
H. Vandermay.
Fig. 5
INVENTOR
W. P. Barclay.

(No Model.) 5 Sheets—Sheet 4.
W. P. BARCLAY.
CAR WHEEL GRINDING AND TURNING MACHINE.
No. 303,609. Patented Aug. 19, 1884.
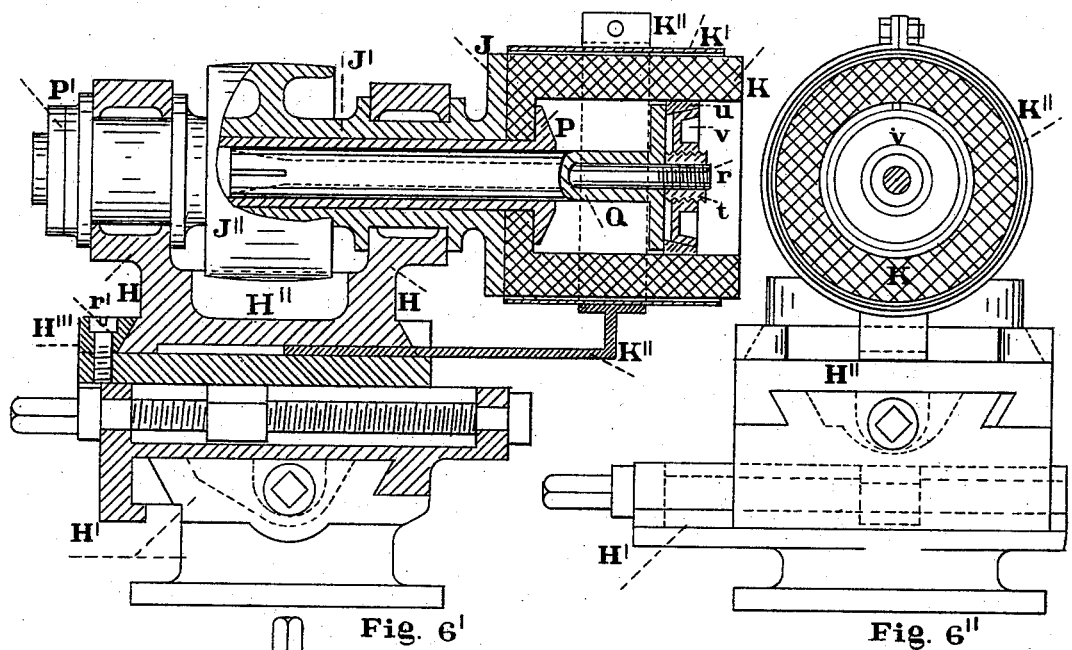
Fig. 6$^I$      Fig. 6$^{II}$
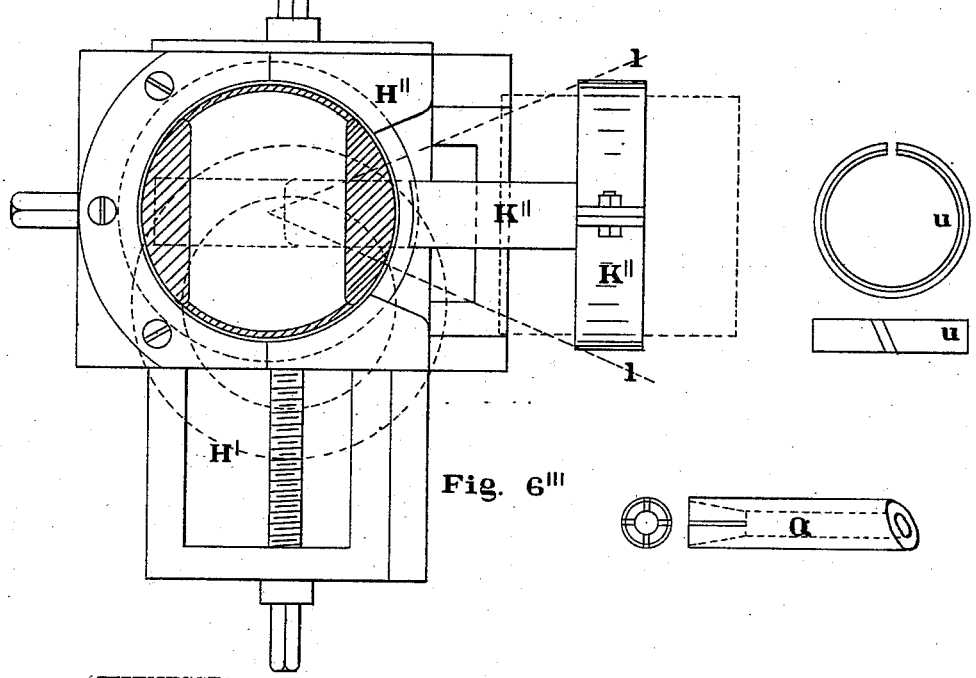
Fig. 6$^{III}$
WITNESSES:
F. S. Johnson
H. Vandermay
INVENTOR
W. P. Barclay (No Model.)  5 Sheets—Sheet 5.
W. P. BARCLAY.
CAR WHEEL GRINDING AND TURNING MACHINE.
No. 303,609.  Patented Aug. 19, 1884.
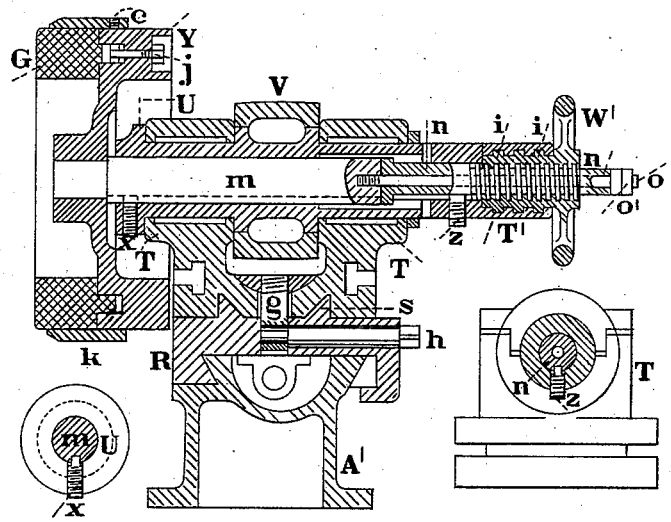
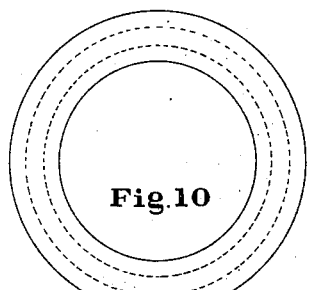
Fig. 10
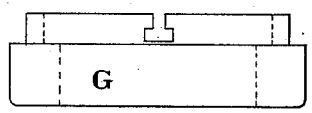
Fig. 11
Fig. 7
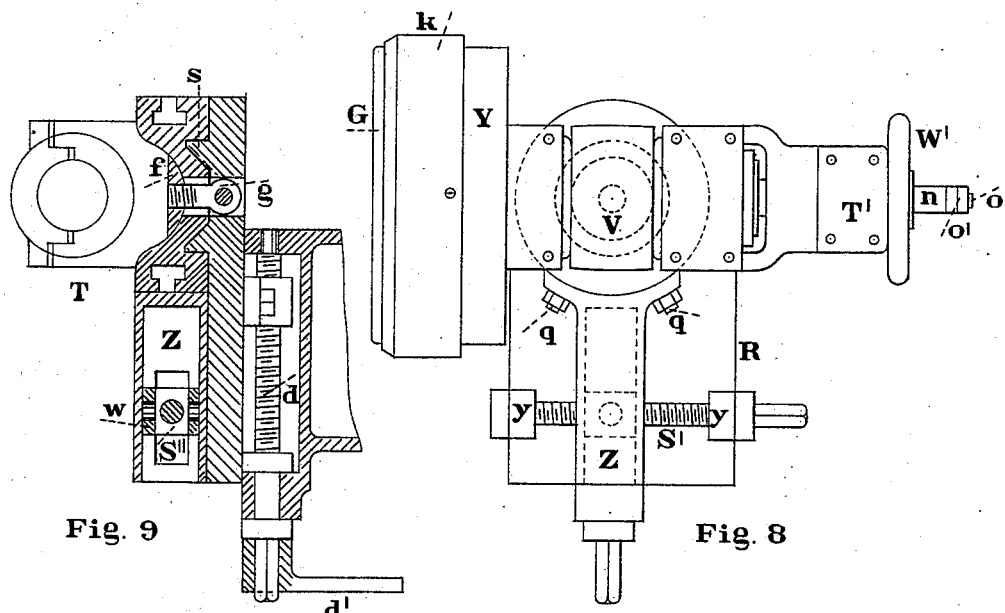
Fig. 9  Fig. 8
WITNESSES:  INVENTOR
F. S. Johnson  W. P. Barclay.
H. Vandermay.
N. PETERS, Photo-Lithographer, Washington, D. C.

UNITED STATES PATENT OFFICE.

WILLIAM P. BARCLAY, OF CHICAGO, ILLINOIS.

CAR-WHEEL GRINDING AND TURNING MACHINE.

SPECIFICATION forming part of Letters Patent No. 303,609, dated August 19, 1884.

Application filed May 10, 1883. (No model.)

*To all whom it may concern:*

Be it known that I, W. P. BARCLAY, a citizen of the United States, residing at Chicago, in the county of Cook and State of Illinois, have invented a new and useful Grinding and Turning Machine, which is applicable for grinding and turning the treads and flanges of car-wheels having either a chilled tread or a steel tire, the following specification and annexed drawings describing and illustrating the novel features of the machine, so that any one skilled in the art to which the invention appertains could make and operate the same.

The invention is more especially devised to overcome certain defects in the manufacture of what are known as "chilled car-wheels," the treads of such car-wheels being of so hard a nature that the operation of turning the tread and flange by the ordinary process of turning iron with a steel turning-tool becomes impracticable from the expense accruing from such a method.

Figure 1:
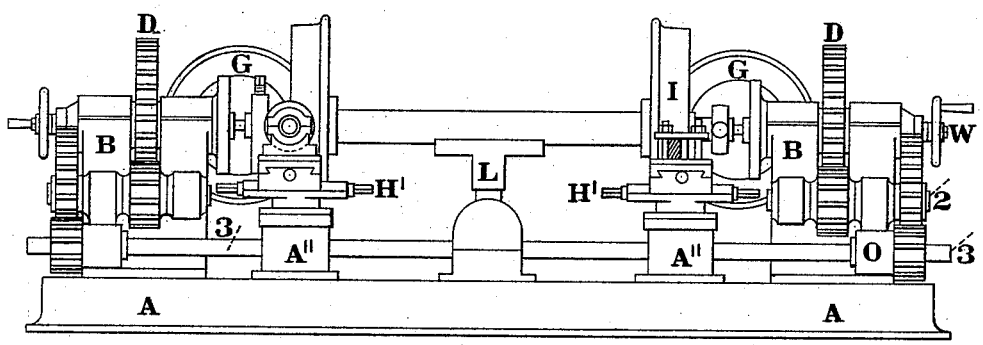
Figure 2:
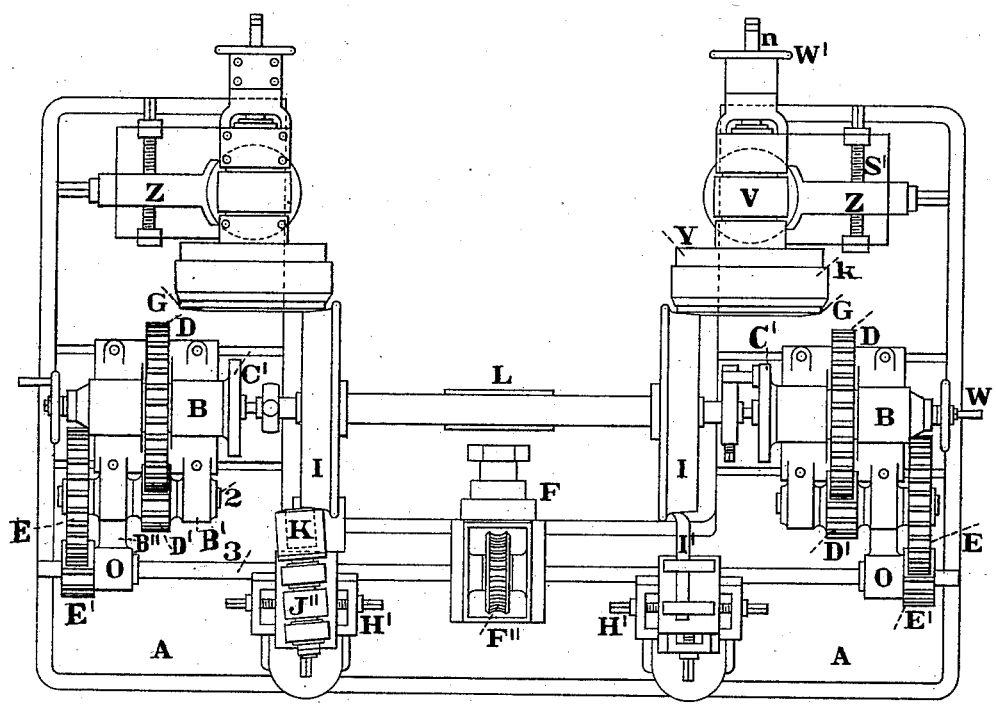
Figure 3:
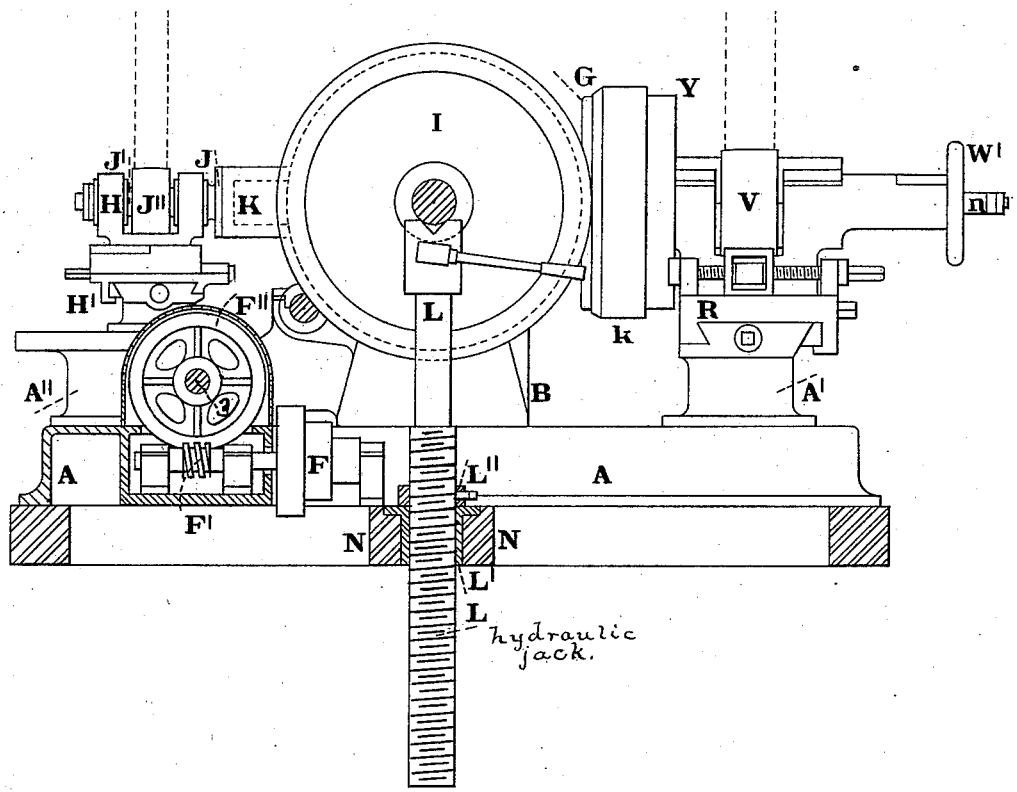

In the accompanying drawings, Figure 1 represents a side elevation of the machine, and Fig. 2 is a plan view of the same. The foregoing figures also show a pair of car-wheels, I, in position on their axle, supported by the driving-heads of the machine. Fig. 3 is an increased transverse elevation of Fig. 1. Figs. 4 and 5 are elevation and plan views of the driving-heads B, and are drawn on an increased scale. Figs. 6 and 6' are side sectional elevations of an abrading-tube, with its accompanying spindles, slides, and columns. The abrading-tube is also shown protected by a cylindrical shield. Figs. 6'' and 6''' are elevation and plan views, respectively, of Fig. 6'. Figs. 7 and 8 are elevation and plan views of the appurtenances which support and operate the abrading-tube connected thereto, and Fig. 9 is a longitudinal sectional elevation of Fig. 8 through the center of the belt-pulley. Fig. 10 is an end view of the grinding-face of an abrading-tube, and Fig. 11 is a side view of the same.

Similar letters of reference indicate corresponding parts throughout the several views.

Referring to the drawings, the bed-plate of the machine is represented by letter A. The other parts of the machine are supported by the bed-plate, and are all firmly united together by the necessary bolts. The driving-heads B are similar and duplicates of each other, and are secured to the bed-plate A by bolts $b$ and cross-plates $b'$, the lower ends of bolts $b$ being firmly secured to the said cross-plates. The car-wheels I are shown in position on their axle, and the axle and car-wheels are made to revolve with the spindles of driving-heads B. The spindles C of the driving-heads have each a face-plate, C'. The face-plates are furnished with drivers that engage with the clamps that are secured to the car-wheel axle, the car-wheels and axle revolving with the spindles C of the driving-heads when motion is communicated to the said spindles. Motion is communicated to the spindles C, wheels D, pinions D', shafts 2, wheels E, and pinions E', connected with the driving-heads B by belt-pulleys F, operating a worm, F', and worm-wheel F'', which combination causes the shaft 3 to revolve, so that the respective wheels, pinions, and shafts immediately connected with each of the driving-heads, and which are shown definitely in Fig. 5, are all made to revolve together, and the corresponding wheels, pinions, and spindles of the driving-heads make precisely with each other the same number of revolutions.

In Fig. 3 a transverse elevation of certain parts of the machine are shown. The column A' is firmly bolted to the bed-plate A and upholds the several parts that are relatively constructed for suspending and admitting all required movements to be given to the large abrading-tube G. The columns A'' support the lower slide-rests, H', and to the upper slide-plate is connected the base of pillows H, that hold the spindle J', one end of said spindle having a face-plate, J, and to which is firmly secured the abrading-tube K. The hydraulic jack L is for the purpose of raising and lowering the axles and car-wheels to and from the height of the centers of the driving-heads B. The hydraulic jack itself can also be lowered or raised bodily by moving it through the step L', which is firmly secured to the beams N, the nut L'' holding the hydraulic jack in the position to which it is adjusted. Projecting from the nut L'' is a small set-screw for tightening the said nut. When large and heavy car-wheels are placed in the grinding-machine, they do not require to be lifted by the ram of the hydraulic jack so great a distance as car-wheels of a less diameter, and the hydraulic jack is therefore suspended by the nut L″ and guided by the step L′, so as always to be in a vertical position. When lifting large and heavy car-wheels, the hydraulic jack is held as high in the step L′ by the nut L″ as convenient, merely allowing clearance for the head of the hydraulic jack to pass underneath the axle of the car-wheels when the same are on the axle and resting upon the floor or track. By so doing the ram of the hydraulic jack is allowed to remain in its working-barrel the utmost length when lifting heavy loads.

In Figs. 4 and 5 are represented the elevation and plan views of the driving-heads, Fig. 5 showing the plan view of the driving-heads partly in section. The driving-heads B have spindles C, to which the gear-wheels D are made fast. The face-plates C′ are also attached to the spindles C. Each of the spindles C have inner spindles, C″, and they revolve all together. The inner spindles, C″, can be moved in a longitudinal direction by the screws S, operated by the hand-wheels W. The inner spindles, C″, are furnished with steel centers $a$, that project from the face-plate ends of the spindles, and from the said centers $a$ are suspended the axles with the car-wheels. The driving-heads B have each two projecting arms, B′ and B″. Pillows are formed for the shafts 2 and 3 upon the projecting arms, and the driving-heads can be moved upon the bed-plate A, so as to be placed farther apart or nearer to each other, to suit the different lengths of car-wheel axles. The pinions E′, wheels E, pinions D′, and wheels D move along with the driving-heads B when the same are changed in position upon the bed-plate. The pillows O have each a revolving bush, O′, that has a groove cut on the periphery of its bore, so as to allow the revolving bush to slide along the feather formed upon the shaft 3. The pinions E′ have a projecting neck with a collar, $e$, the collars working in recesses formed in the pillows O, to hold the pinions E′ always in the same relative position to the said pillows, and when the driving-heads B require to be shifted in their position on the bed-plate the pinions E′ are obliged to move the same distance along on the shaft 3 that the driving-heads B have been shifted along the bed-plate A.

The small abrading-tube K with its connections are represented fully in Figs. 6, 6′, 6″, and 6‴. The abrading-tube K is secured to the face-plate J. The face-plate J and pulley J″ are shown as constituting a solid part of the spindle J′, but would in actual practice be made separate and afterward secured to the spindle J′ by set-screws. The spindle J′ is hollow, and has a tubular bolt, P, passing longitudinally through the spindle. The head of the bolt is made as large in diameter as is convenient, so as to present a large bearing-surface to the flange that projects inwardly from the abrading-tube K. The tubular bolt P has nuts P′, and when they are tightened the tubular bolt secures rigidly to the face-plate J the abrading-tube K. An adjustable spindle, Q, fits tight into the tubular bolt P, the said adjustable spindle being used as an extra support to the abrading-tube K when it is very long. The adjustable spindle has a bolt, $r$, passing longitudinally through its center, the said bolt having a tapered head, and when the nut $t$ on the end of bolt $r$ is tightened the tapered head of bolt $r$ wedges the adjustable spindle Q to the position in which it is set, the said adjustable spindle Q having at the end that the tapered head of bolt $r$ fits into, several slits cut lengthwise of the spindle for a short distance, so that that end of the adjustable spindle can yield to the wedging-pressure of the tapered head of bolt $r$ when the same is drawn tight up by the nut $t$. The end of the adjustable spindle Q, that reaches into the abrading-tube K, has a large flange, and the nut $t$ has a thread also cut upon its outer periphery. The ring $u$ is tapered on its inside, and is cut through at an angle in one place. The nut $v$ is tapered to correspond to the taper of the ring $u$, and as the nut $v$ is screwed up the tapered edge of the said nut springs the ring $u$ to fit close to the abrading-tube K, holding the end of abrading-tube rigid and free from vibration, especially when the abrading-tube is of considerable length. The abrading-tube K is shielded by a stationary cylindrical shield of metal, K′. The shield K′ is supported by the adjustable arm K″, and the base of the pillows H has a recess that the lower portion of adjustable arm K″ can slide into the upper slide-plate, H″, being so constructed that the adjustable arm K″ can be placed at an angle to the said slide-plate or to the tread of the car-wheel. The base of pillows H turns in the cone-shaped recess that is formed upon the upper slide-plate, H″, whenever the arm K″ is caused to change its inclination to the said slide-plate. The pillows H and the shield K′, when adjusted to the desired angle, are prevented from shifting around by screwing down the clamp-plate H‴ by the set-screws $i'$. The shield K′ and the arm K″ can be shifted in as the abrading-tube K wears away, the lower portion of arm K″ sliding into the recess a greater distance when forced. When the inclination of the abrading-tube K to the car-wheel is changed, the arm K″ changes to the same inclination, and holds the shield K′ always concentric with the said abrading-tube.

In Fig. 6‴ the dotted lines 1 indicate the greatest angle that the arms K″ and shield K′ can be placed at to the slide-plate H″.

The large abrading-tube G and the manner in which it is supported and operated are fully shown in Figs. 7, 8, and 9. A′ is a column that is bolted to the bed-plate A. The top of said column is of a V-shape, and is adapted to the slide-plate R, the said slide-plate having a circular projection, s, which fits into a recess formed in the base of pillows T. The base of pillows T is secured to the slide-plate R by the nut f, eyebolt g, and spindle h. The end of spindle h (shown projecting into eye of bolt g) is made eccentric to the other part of said spindle, and when the spindle h is turned partly around it either slackens or tightens the base of pillows T in relation to the slide-plate R. The base of pillows T is circular, and has connected to it, by the bolts q, a tail-piece, Z. The pillows T can be made to turn upon the slide-plate R, the circular projection s guiding the base of pillows T, so as to revolve around the bolt g as a center. The tail-piece Z is furnished with a nut, S'', and two slide-blocks, w, the said slide-blocks being pivoted from and on opposite sides of the nut S''. The screw S' is secured to the slide-plate R by two small pillows, y. The screw S' takes into the nut S'', and when the screw S' is turned around it causes the tail-piece Z to move either toward or from the operator, the slide-blocks w allowing the tail-piece Z to be placed at different angles to the slide-plate R. The tail-piece Z being attached to the base of pillows T, and the spindle U being supported by the said pillows, whenever the tail-piece Z is changed in its position to the slide-plate R by turning around the screw S' the spindles m and U cause the face-plate Y and abrading-tube G to change their positions accordingly, placing the abrading-tube G at a different angle to the tread of car-wheel. The hollow spindle U revolves in the boxes of the pillows T, and between the pillows is a belt-pulley, V, that is made fast to the said spindle. The hollow spindle U has a spindle, m, fitting into it, both spindles revolving together. A groove is cut in spindle m its entire length, and the spindle U has a tongue-bolt, x, and the inner end of said bolt fits into the groove formed in the spindle m. The spindle m can be run in or out by the hand-wheel W', and as the abrading-tube G becomes shorter by wear the hand-wheel W' is gradually turned around, so as to keep the face of abrading-tube G bearing upon the tread of the car-wheel.

To the spindle m the face-plate Y is firmly attached, and to the face-plate Y the abrading-tube G. The abrading-tube G is secured to the face-plate Y by a number of bolts, j, the abrading-tube G having T-shaped slits for the heads of said bolts. The abrading-tube G is encircled by an adjustable tube, k, of iron or other metal. The tube k, as the abrading-tube G wears away, can be occasionally forced back by the workman, so as to cover more of the rim of face-plate Y, a small set-screw, c, being used to retain the tube k when adjusted in its place. I prefer the abrading-tube G to be an eighth of an inch smaller in diameter than the tube k, and the intervening space between the abrading-tube G and the tube k to be filled with plaster-of-paris in a plastic condition, or other equally quick solidifying composition. This fills up all irregularities that the periphery of abrading-tube G lacks from a true circle, and is an expeditious method of confining the abrading-tube G so that it is firmly bound by the metal tube k, so as to prevent the bursting of the abrading-tube G when revolving rapidly. The hand-wheel W' has a deep hub, and upon the hub are formed several thrust-collars, i, the hub of hand-wheel revolving in pillow T'. The hub of hand-wheel W' has a screw cut upon its inner periphery, and when the said hand-wheel is turned around it compels the thrust-spindle n, and through the said spindle the spindle m, with its face-plate Y, to move out or in according to the direction that the hand-wheel W' is moved. The thrust-spindle n has a bolt, o, passing through it, one end of which is screwed tight into the spindle m; or the spindle m and bolt o can be welded together, the outer end of bolt o having nuts o'. The thrust-spindle n has a screw-thread formed upon it, the bore of the hub of hand-wheel W' having a corresponding thread cut on its periphery, and as the hub of hand-wheel W' is confined in its place in the pillow T' by the thrust-collars i, and the thrust-spindle n prevented from turning around in the bore of hub of hand-wheel W' by the inner end of tongue-bolt z, working in a groove formed the entire length of spindle n, the spindle n must of necessity move in the direction of its length whenever the hand-wheel W' is turned around, the said spindle n moving out or in according to the direction in which the said hand-wheel is caused to revolve, and the spindle n being confined between the inner end of spindle m and the nuts o' on bolt o, the spindle n must necessarily also move the spindle m, face-plate Y, and abrading-tube G along with it whenever the hand-wheel W' is caused to revolve.

Having described in detail the different parts of my improved grinding and turning machine, the operation of the same is as follows: The car-wheels that require to be trued are first raised by the ram of the hydraulic jack to the height of the centers a of the driving-heads B, and the axle of the car-wheels secured by the projecting centers a of the spindles C''. The axle and car-wheels are then made to revolve by giving motion to the belt-pulley F, which causes all the wheels, spindles, and shafts intervening between the driving-heads B and said belt-pulley to revolve according to the direction of the acting force, and the corresponding wheels, pinions, and shafts of the driving-heads revolve in the same direction and at the same rate of speed. The large abrading-tubes G are then given a revolving motion by their respective belt-pulleys V, and they, as hereinbefore described, can be adjusted to grind the treads of the car-wheels to any required taper. The faces of the large abrading-tubes G are intended to be nearly the full breadth of the tread of car-wheels, and when in operation the abrading-tubes G also could be given a reciprocating transverse motion across the face of car-wheels I by giving an alternate movement to the handle $d'$, which operates the screw $d$. The small abrading-tubes K are given a rapid revolving motion by their respective belt-pulleys $J''$, and are intended to work equally well upon the tread or the flanges of the car-wheels. They also can be placed at an angle to the flanges of the car-wheels, as already described, and a curvilinear shape given to the flanges. In Figs. 1 and 2 only one small abrading-tube is shown. The other tube is supposed to be temporarily replaced by an ordinary steel turning-tool, $I'$, as the machine can be used solely as a grinding-machine; or when car-wheels with steel tires are suspended from the centers $a$ of the driving-heads the machine can then be used as a turning-lathe and grinding-machine combined. The dust arising from the abrading-tubes and car-wheels is conveyed away by pipes that connect with an exhaust-fan.

The invention having been fully described, I claim as new and original the following:

1. The driving-heads B, with arms $B'$ and $B''$, spindles C, wheels D, face-plates $C'$, spindles $C''$, and centers $a$, in combination with pinions $D'$, shafts 2, wheels E, pinions $E'$, revolving bushes $O'$, and shaft 3, substantially as shown and described.

2. The pulley F, and spindle, worm $F'$, worm-wheel $F''$, and driving-shaft 3, in combination with driving-heads B and the intermediate gear-wheels, pinions, and shafts, used as a means for rotating the spindles C, face-plates $C'$, and car-wheels I, substantially as shown and described.

3. The abrading-tube K, face-plate J, spindle $J'$, pillows H, with conical-shaped base adapted to slide-plate $H''$ and clamp-plate $H'''$, so as to allow the abrading-tube to be placed at different angles to the said slide-plate, in combination with the slide-rest $H'$, substantially as shown and described.

4. The abrading-tube K, in combination with a face-plate, J, tubular spindle $J'$, nuts $P'$, tubular bolt P, adjustable spindle Q, tightening-bolt $r$, nut $t$, adjustable ring $u$, and nut $v$, substantially as shown and described.

5. The abrading-tube K, face-plate J, and spindle $J'$, in combination with the stationary adjustable shield $K'$, and adjustable arm $K''$, for supporting the said shield, substantially as shown and described.

6. The revolving abrading tube or tubes equipped with means for suspending and rotating the same, as hereinbefore described, in combination with the devices for suspending and rotating the axles and the car-wheels, when attached to the same, all conjointly used for the object of making the periphery or tread of car-wheels smooth and concentric with the journals of the axles, substantially as shown and described.

7. The combination of a revolving abrading tube or tubes K, and turning-tool $I'$, operating upon the periphery of a car-wheel attached to an axle suspended from centers $a$, as in a lathe, for the object of making the periphery of a car-wheel true and concentric with the axis of rotation, substantially as shown and described.

WILLIAM PARIS BARCLAY.

Witnesses:
JAMES JOHNSTON ANDERSON,
NICHOLAS VANDERMAY.